2,777,606
Patented Jan. 15, 1957

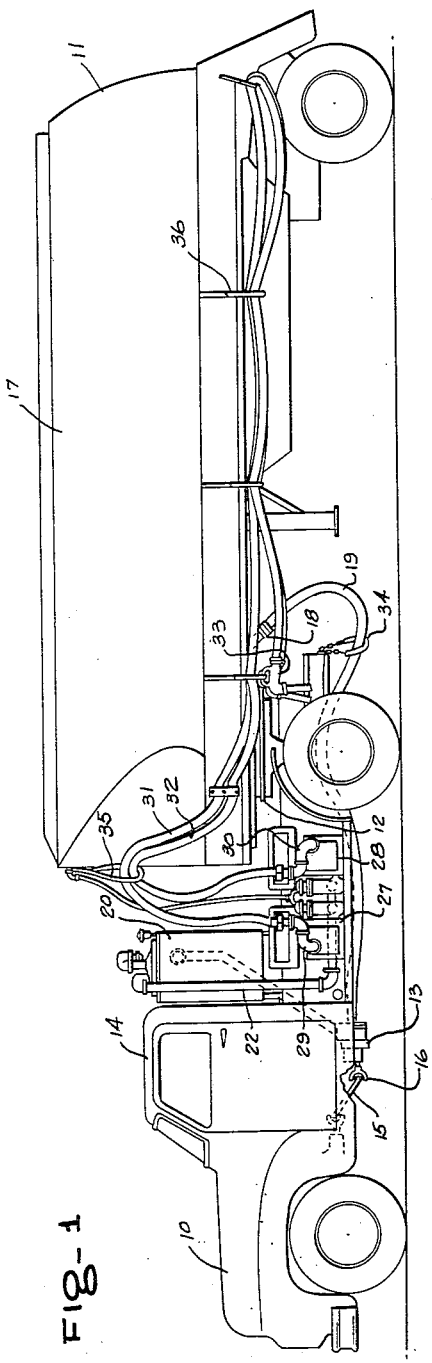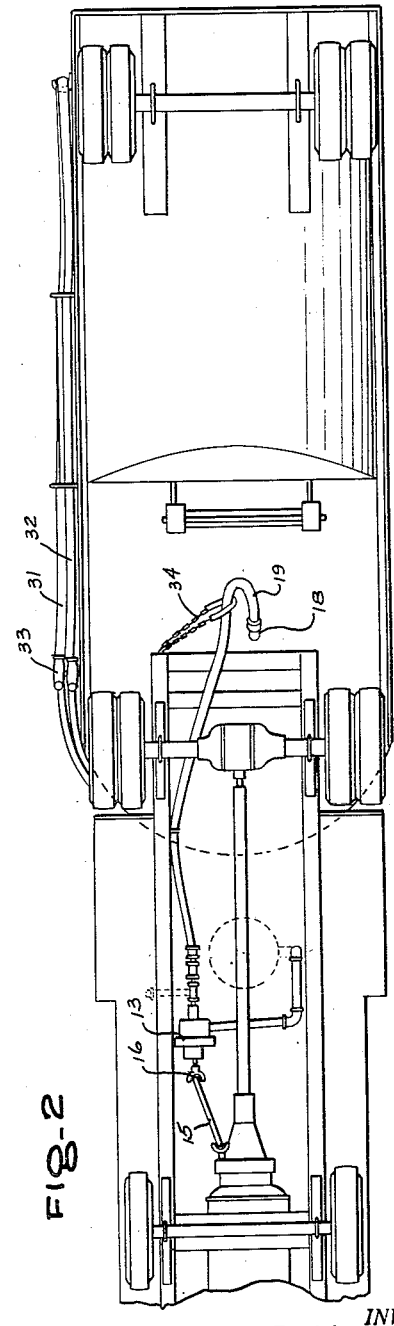

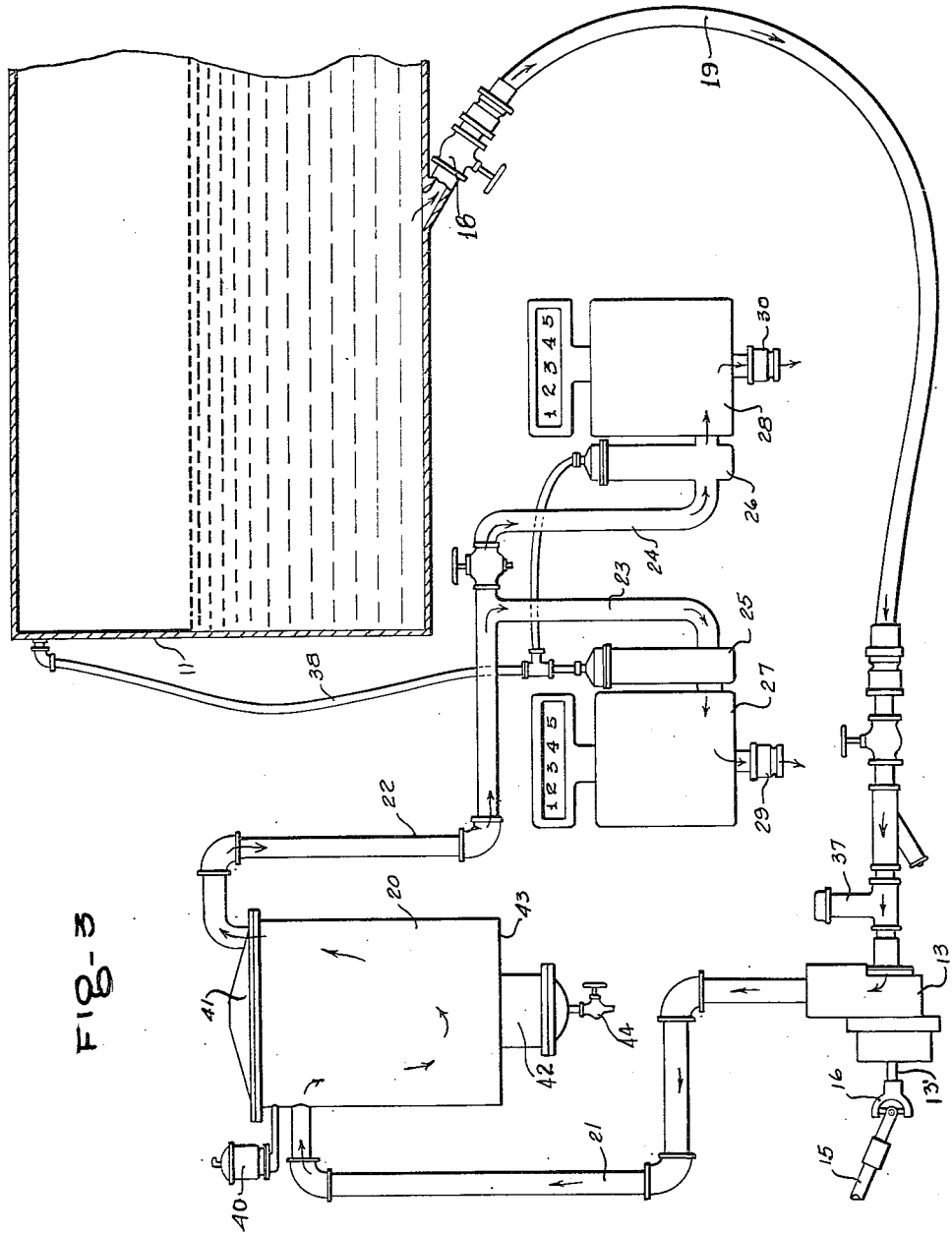

2,777,606

FUEL CHARGING DEVICE FOR A TRACTOR TANK TRAILER

Charles Beatty Moore and Happy I. Franklin, El Paso, Tex.

Application December 31, 1954, Serial No. 479,102

3 Claims. (Cl. 222—26)

The present invention relates to vehicles for transporting fluids in bulk, such as petroleum products and the like, and in particular to a pump for liquid fuel mounted on a tractor of a tractor tank trailer vehicle and operatively connected to the power take-off of the tractor.

The primary object of the present invention is to provide a mobile bulk fuel charging device for land-based aircraft.

Another object of the present invention is to provide a bulk fuel charging device for use with a tractor tank trailer and one which is highly resistant to the common hazards, such as fire, of bulk fuel pumps having separate engines.

A further object of the present invention is to provide a bulk fuel charging device for land-based aircraft of large liquid fuel capacity, one having a positive power source for the bulk fuel pump, and one compact in arrangement and highly effective in action.

These and other objects and advantages of the present invention will be fully apparent from the following description when taken in conjunction with the annexed drawings, in which:

Figure 1 is a side view in elevation of the tractor tank trailer with the fuel charging device of the present invention installed thereon;

Figure 2 is a bottom view of the tractor and tank trailer of the present invention; and Figure 3 is a schematic view showing the elements of the present invention as connected together and to the tank trailer.

Referring in greater detail to the drawing in which like numerals indicate like parts throughout the several views, a tractor 10 is shown with a tank trailer 11 arranged in tandem relation with respect to the tractor 10 and having its front end swivelly connected to the tractor 10 by means of a "fifth wheel," as indicated by the reference numeral 12 in Figure 1.

The bulk fuel charging device of the present invention consists of a pump 13 positioned beneath the cab 14 of the tractor adjacent the connected front end of the tank trailer and operatively driven by a power take-off device, indicated by the reference numeral 15, and having a universal joint 16 connected to the power input shaft 13' of the pump 13.

The bottom of the tank compartment 17 is provided with an outlet fitting 18 to which is attached a first flexible hose or conduit 19 having one end connected to the outlet fitting 18 and the other end connected to the inlet end of the pump 13.

A filter 20 is disposed on the tractor adjacent the connected front end of the tank trailer 11 and is connected in communication with the outlet end of the pump 13 by means of a second conduit 21. The filter has an air eliminator 40 which is exteriorly of and in communication with the interior thereof adjacent the closed top 41 and a water collector 42 depending from the bottom 43 of the filter, the water collector 42 having a hand valve 44 for withdrawing the collected water therefrom. A third conduit 22 connects the filter 20 with a pair of branch conduits 23 and 24 which lead to the air separators 25 and 26, respectively, positioned one on each side of the metering devices 27 and 28, respectively. Each of the metering devices 27 and 28 are provided with outlet fittings 29 and 30, respectively, each adapted to be connected to flexible hoses 31 and 32, as seen in Figure 1, the other ends of the hoses 31 and 32 being provided nozzles 33 adapted to be inserted into the fuel inlet opening of aircraft such as jet planes and others. A rubber covered chain 34 supports the loop of the conduit 19 where it is disposed beneath the bottom of the tank trailer 11 and connected by means of the outlet fitting 18 to the tank trailer intermediate of its ends. Other supporting means indicated generally by the reference numeral 35 in Figure 1 which may consist of rubber-covered springs or chains, support the loops of the flexible hoses 31 and 32 and permit the tractor 10 and the tank trailer 11 to have swivelling action about a short radius. The intermediate lengths of the hoses 31 and 32 are looped over hooks 36 spaced along one side of the tank trailer 11 in which position they are immediately accessible for quick detachment from the tank trailer 11 for insertion by their nozzles within the tanks of the aircraft to be fueled.

It will be seen, therefore, that the present invention provides a bulk fuel charging device of great maneuverability and one which may be transported about on field of an airport.

The tank trailer and the tractor with its power take off driven pump have special advantages over the fuel dispensing trucks and tanks presently in use. The latter generally have separate internal combustion engines for driving their pumps or have electrically driven pumps mounted within the rear end of the truck tanks or trailer tanks. Starting in operation of these separate internal combustion engines or electric pumps has created a fire hazard in the past. Frequently it has been found that the engine or electrically driven pump is inoperative when the fuel truck or fuel tractor-trailer vehicle is in position to deliver fuel to the plane waiting for fuel.

The present invention with its power take-off driven pump provides a sure and ready means of operating the pump to deliver the fuel without the use of an extra engine or driving means.

While ordinarily kept attached to its tank trailer, each tractor may be disconnected and used with other tank trailers, as desired.

By eliminating the use of an extra internal combustion engine or other driving means for the pump, space has been saved at the rear end of the tank trailer and the fuel capacity of the tank trailer has been increased. Tank trailers built according to the above description are more economical to build. The air motor and the reel which is usually driven thereby, which winds up the delivery hose, has been eliminated, and the fuel delivery hoses of the present invention are more readily accessible, saving time and labor in their use connecting the fuel charging device of the present invention to the aircraft awaiting fuel.

A stub connection 37 on the suction or inlet side of the pump 13 permits the attachment of one of the hoses 31 or 32 for pumping excess or unwanted fuel out of an aircraft when desired, the other hose being inserted in the top of the tank trailer. A flexible hose 38 connects each of the air separators to the space within the tank trailer.

In use, the tank trailer is filled with the liquid fuel, gasoline, kerosene, jet fuel, and other petroleum products, and the fuel flows in the directions indicated by the arrows in Figure 3, to pump fuel to an aircraft (not shown).

What is claimed is:

1. For use with a vehicle comprising a tractor having a power take-off and a tank trailer arranged in tandem relation with respect to said tractor and having the front end swivelly connected to said tractor, a fuel charging device comprising a pump having an input shaft disposed on said tractor adjacent the connected front end of said tank trailer and having the input shaft operatively connected to said power take-off, an outlet fitting projecting from the bottom of said tank trailer intermediate the front and back ends, a first conduit connecting said outlet fitting to the inlet end of said pump, a filter positioned adjacent said pump, an air eliminator exteriorly of said filter and in communication with the interior of said filter adjacent the top thereof, a water collector depending from the bottom of said filter, a second conduit connecting said filter to the outlet end of said pump, a metering device positioned adjacent said pump and said filter, an air separator arranged adjacent said metering device and connected in communication with said metering device and in communication with the interior of said tank trailer adjacent the top thereof, a branch conduit extending from said separator, a third conduit connecting said filter to said branch conduit, and an outlet fitting on said metering device adapted to be connected to a flexible fuel discharge hose.

2. For use with a vehicle comprising a tractor having a power take-off and a tank trailer arranged in tandem relation with respect to said tractor and having the front end swivelly connected to said tractor, a fuel charging device comprising a pump having an input shaft disposed on said tractor adjacent the connected front end of said tank trailer and having the input shaft operatively connected to said power take-off, an outlet fitting projecting from the bottom of said tank trailer intermediate the front and back ends, a first conduit connecting said outlet fitting to the inlet end of said pump, a filter positioned adjacent said pump, an air eliminator exteriorly of said filter and in communication with the interior of said filter adjacent the top thereof, a water collector depending from the bottom of said filter, a second conduit connecting said filter to the outlet end of said pump, a metering device positioned adjacent said pump and said filter, an air separator arranged adjacent said metering device and connected in communication with said metering device and in communication with the interior of said tank trailer adjacent the top thereof, a branch conduit extending from said separator, another metering device positioned adjacent said first named metering device, another air separator arranged adjacent said another metering device and connected in communication with the interior of said tank trailer adjacent the top thereof, another branch conduit extending from said another air separator, a third conduit connecting said filter to said branch conduits, and an outlet fitting on said metering devices adapted to be connected to a flexible fuel discharge hose.

3. The combination according to claim 1 which includes in addition a stub connection positioned on the inlet side of said pump and in communication with said first conduit for pumping excess or unwanted fuel out of an aircraft.

References Cited in the file of this patent

UNITED STATES PATENTS

| | | |
|---|---|---|
| 1,696,954 | Hayes | Jan. 1, 1929 |
| 2,498,229 | Adler | Feb. 21, 1950 |
| 2,506,911 | Zeigler | May 9, 1950 |
| 2,543,564 | Bakewell | Feb. 27, 1951 |
| 2,707,577 | Trotter et al. | May 3, 1955 |